United States Patent
Sleiman et al.

(10) Patent No.: US 12,163,611 B2
(45) Date of Patent: Dec. 10, 2024

(54) BAYONET FOR LH2 OFFLOADING

(71) Applicant: FirstElement Fuel, Inc., Newport Beach, CA (US)

(72) Inventors: Ghassan Sleiman, Torrance, CA (US); Tim Brown, San Juan Capistrano, CA (US)

(73) Assignee: FirstElement Fuel, Inc., Newport Beach, CA (US)

( * ) Notice: Subject to any disclaimer, the term of this patent is extended or adjusted under 35 U.S.C. 154(b) by 0 days.

(21) Appl. No.: 17/813,572

(22) Filed: Jul. 19, 2022

(65) Prior Publication Data
US 2023/0023439 A1    Jan. 26, 2023

Related U.S. Application Data

(60) Provisional application No. 63/223,891, filed on Jul. 20, 2021.

(51) Int. Cl.
*F16L 37/56* (2006.01)
*F16L 37/248* (2006.01)
(Continued)

(52) U.S. Cl.
CPC ........... *F16L 37/248* (2013.01); *F17C 5/002* (2013.01); *F17C 5/02* (2013.01); *F17C 5/04* (2013.01);
(Continued)

(58) Field of Classification Search
CPC ..... F16L 23/02; F16L 27/1012; F16L 37/565; F16L 39/005; F16L 59/184; F17C 5/002; F17C 5/02; F17C 2205/0352
(Continued)

(56) References Cited

U.S. PATENT DOCUMENTS

| 5,361,796 A | 11/1994 | Mutter |
| 7,360,563 B2 | 4/2008 | Mitlitsky |

(Continued)

FOREIGN PATENT DOCUMENTS

| DE | 102007023821 A1 | 11/2008 |
| EP | 1 394 105 | 3/2004 |

(Continued)

OTHER PUBLICATIONS

JP-10231970-A—Machine Translation—English (Year: 1998).*

(Continued)

*Primary Examiner* — William S. Choi
(74) *Attorney, Agent, or Firm* — Knobbe, Martens, Olson & Bear, LLP

(57) ABSTRACT

A bayonet coupling system includes a bayonet, a bayonet coupler, and a seal. The bayonet includes a bayonet tube configured to enable the flow of hydrogen fuel therethrough, and a flange coupled to the bayonet tube. The seal is configured to surround the bayonet tube and contact the flange along one side of the flange. The bayonet coupler includes a bayonet coupler tube having an inside diameter larger than an outside diameter of the bayonet tube, the bayonet coupler tube configured to receive the bayonet tube and to seal against the flange at the seal. The bayonet coupler is fixedly mounted directly or indirectly to a hydrogen storage tank such that a longitudinal axis of the bayonet coupler is inclined a predetermined angle with respect to horizontal to prevent a substantial thermal gradient from forming at the seal.

17 Claims, 4 Drawing Sheets

(51) Int. Cl.
*F16L 59/00* (2006.01)
*F17C 5/00* (2006.01)
*F17C 5/02* (2006.01)
*F17C 5/04* (2006.01)
*F17C 13/02* (2006.01)
*F16L 59/18* (2006.01)

(52) U.S. Cl.
CPC .......... *F17C 13/025* (2013.01); *F17C 13/026* (2013.01); *F16L 37/565* (2013.01); *F16L 59/184* (2013.01); *F16L 2201/30* (2013.01); *F17C 2205/0323* (2013.01); *F17C 2205/0352* (2013.01); *F17C 2221/012* (2013.01); *F17C 2223/0153* (2013.01); *F17C 2227/0339* (2013.01); *F17C 2227/044* (2013.01); *F17C 2250/032* (2013.01); *F17C 2250/0408* (2013.01); *F17C 2250/0434* (2013.01); *F17C 2250/0439* (2013.01); *F17C 2250/0443* (2013.01); *F17C 2250/046* (2013.01); *F17C 2250/075* (2013.01); *F17C 2265/063* (2013.01); *F17C 2265/065* (2013.01)

(58) Field of Classification Search
USPC ...................... 285/330, 123.1, 904
See application file for complete search history.

(56) References Cited

U.S. PATENT DOCUMENTS

| | | | |
|---|---|---|---|
| 9,045,238 | B2 | 6/2015 | Lohmann et al. |
| 10,627,797 | B2 | 4/2020 | Mathison |
| 11,193,632 | B2 | 12/2021 | Handa |
| 11,339,926 | B2 | 5/2022 | Mathison |
| 11,370,651 | B2 | 6/2022 | Natori et al. |
| 11,506,340 | B1 | 11/2022 | Sleiman et al. |
| 11,525,538 | B2 * | 12/2022 | Schulz .................. F16L 59/184 |
| 11,549,647 | B1 | 1/2023 | Sleiman et al. |
| 11,598,485 | B2 | 3/2023 | Sleiman et al. |
| 11,913,581 | B2 | 2/2024 | Sleiman et al. |
| 2003/0008185 | A1 | 1/2003 | Sugino et al. |
| 2006/0090399 | A1 | 5/2006 | Wikstrom et al. |
| 2007/0257043 | A1 | 11/2007 | Kanoya et al. |
| 2010/0294393 | A1 | 11/2010 | Allidieres et al. |
| 2011/0169259 | A1 * | 7/2011 | Schulze |
| 2011/0225985 | A1 | 9/2011 | Hartono et al. |
| 2012/0104036 | A1 | 5/2012 | Farese et al. |
| 2013/0008558 | A1 | 1/2013 | Cajiga et al. |
| 2014/0263420 | A1 | 9/2014 | Lambrix et al. |
| 2014/0352792 | A1 | 12/2014 | Shim et al. |
| 2014/0364999 | A1 | 12/2014 | Kennett et al. |
| 2015/0192250 | A1 | 7/2015 | Oldham et al. |
| 2016/0116113 | A1 | 4/2016 | Mrowzinski |
| 2017/0023180 | A1 | 1/2017 | Petit et al. |
| 2017/0030522 | A1 | 2/2017 | Emilsen et al. |
| 2017/0074707 | A1 | 3/2017 | Mathison |
| 2017/0102110 | A1 | 4/2017 | Lomax et al. |
| 2017/0350867 | A1 | 12/2017 | Eihusen |
| 2018/0038550 | A1 | 2/2018 | Kondo |
| 2018/0073679 | A1 | 3/2018 | Roberge et al. |
| 2018/0151898 | A1 * | 5/2018 | Knapp .................. F17C 5/02 |
| 2018/0292050 | A1 | 10/2018 | Thiessen |
| 2018/0346313 | A1 | 12/2018 | Feng et al. |
| 2019/0178447 | A1 | 6/2019 | Poorman et al. |
| 2020/0095113 | A1 | 3/2020 | Crispel et al. |
| 2021/0010642 | A1 | 1/2021 | Kubista et al. |
| 2021/0278028 | A1 * | 9/2021 | Schulz .................. F16L 59/184 |
| 2021/0341101 | A1 | 11/2021 | Allidieres et al. |
| 2022/0026025 | A1 | 1/2022 | Crevatin et al. |
| 2022/0042649 | A1 | 2/2022 | Pennec et al. |
| 2022/0186881 | A1 | 6/2022 | Pollica et al. |
| 2023/0408032 | A1 | 12/2023 | Sleiman et al. |

FOREIGN PATENT DOCUMENTS

| | | | |
|---|---|---|---|
| EP | 3102868 A2 | 12/2016 | |
| FR | 3 094 454 | 10/2020 | |
| JP | 10231970 A * | 9/1998 | |
| KR | 2018051142 A * | 5/2018 | ............ F16L 59/184 |
| RU | 2711890 C1 | 1/2020 | |
| WO | WO-02061321 A1 * | 8/2002 | |
| WO | WO-2016051770 A1 * | 4/2016 | ............. F16L 23/02 |
| WO | WO 2023/004314 | 1/2023 | |
| WO | WO 2023/004322 | 1/2023 | |

OTHER PUBLICATIONS

KR-20180051142-A—Machine Translation—English (Year: 2018).*
WO-2016051770-A1—Machine Translation—English (Year: 2016).*
International Search Report and Written Opinion issued in application No. PCT/US2022/073898 on Jan. 10, 2023.
International Preliminary Report on Patentability issued Jan. 18, 2024 in application No. PCT/US2022/073898.
International Search Report and Written Opinion issued in application No. PCT/US2022/073890 mailed on Nov. 11, 2023.
International Preliminary Report on Patentability issued in application No. PCT/US2022/073890 issued Jan. 18, 2024.

* cited by examiner

BAYONET FOR LH2 OFFLOADING

CROSS-REFERENCE TO RELATED APPLICATIONS

This application claims the benefit of priority from U.S. Provisional No. 63/223,891, filed Jul. 20, 2021, which is expressly incorporated by reference in its entirety.

BACKGROUND

Field

This disclosure relates to the control of the flow of liquid hydrogen fuel to fill one or more liquid hydrogen storage tanks.

Description of the Related Art

Gaseous hydrogen has become a desirable fuel source due to its abundance and cleanliness. Vehicle fueling stations that supply gaseous hydrogen typically store large amounts of hydrogen in liquid form. Large tanker trucks transport liquid hydrogen to fueling stations to refill the stations' liquid hydrogen storage tanks. Accidental spillage or leakage, and inefficient cooling of the lines used to refill such storage tanks can lead to safety and cost issues.

Systems and methods to safely and efficiently refill liquid hydrogen fuel storage tanks would address such problems.

SUMMARY

In some aspects, the techniques described herein relate to a system configured to automatically purge and precool a hydrogen fuel line prior to transfer of hydrogen fuel from a source to a storage tank, including: a hydrogen fuel line configured to fluidically couple a hydrogen tanker storage tank and a fueling station storage tank, the hydrogen storage tanker storage tank and the fueling station storage tank configured to store liquid hydrogen; an input valve configured to control the flow of hydrogen fuel to the fueling station storage tank; a station vent coupled to the hydrogen fuel line; a station vent control valve configured to control the flow of hydrogen fuel to the station vent; a memory storing computer-executable instructions; and a controller in communication with the memory and configured to execute the instructions to configure the controller to: purge moisture from the hydrogen fuel line; pre-cool the hydrogen fuel line; cause hydrogen fuel to flow through the hydrogen fuel line to re-fill the station storage tank; and expel residual hydrogen fuel from the hydrogen fuel line when the station storage tank re-filling is complete.

In some aspects, the techniques described herein relate to a system, wherein the instructions that configure the controller to purge moisture from the hydrogen fuel line include additional instructions that further configure the controller to: send a control signal to a hydrogen tanker to cause a hydrogen tanker storage tank control valve to close and prevent hydrogen fuel from flowing into the hydrogen fuel line; close the input valve to prevent hydrogen fuel from flowing to and from the fueling station storage tank; open a warm hydrogen source valve to allow warm hydrogen fuel to flow from a warm hydrogen source to the hydrogen fuel line; open the station vent control valve to allow the warm hydrogen fuel to flow out of the station vent; and close the station vent control valve in response to a purge condition.

In some aspects, the techniques described herein relate to a system, wherein the purge condition includes one or more of: determining that a predetermined period has passed, determining that a temperature within the hydrogen fuel line has reached a threshold temperature, or determining a condensation level associated with the hydrogen fuel line has reached a threshold condensation level.

In some aspects, the techniques described herein relate to a system, wherein the instructions that configure the controller to pre-cool the hydrogen fuel line include additional instructions that further configure the controller to: send a control signal to a hydrogen tanker to cause a hydrogen tanker storage tank control valve to open and allow hydrogen fuel to flow into the hydrogen fuel line; close the input valve to prevent hydrogen fuel from flowing into and out of the fueling station storage tank; open the station vent control valve to allow cold hydrogen fuel to flow from the hydrogen fuel line to the station vent; receive a temperature measurement from temperature sensor; and close the station vent control valve when the temperature measurement reaches a predetermined level.

In some aspects, the techniques described herein relate to a system, wherein the temperature sensor is coupled to the station vent and indicates the temperature of hydrogen in the station vent.

In some aspects, the techniques described herein relate to a system, wherein the temperature sensor is coupled to the hydrogen fuel line and indicates the temperature of hydrogen in the hydrogen fuel line.

In some aspects, the techniques described herein relate to a system, wherein the instructions that configure the controller to cause hydrogen fuel to flow through the hydrogen fuel line to re-fill the station storage tank include additional instructions that further configure the controller to: send a control signal to a hydrogen tanker to cause a hydrogen tanker storage tank control valve to open and allow hydrogen fuel to flow into the hydrogen fuel line; open the input valve to allow hydrogen fuel to flow from the hydrogen fuel line into the station storage tank; determine a fill level of the station storage tank; and close the input valve to prevent hydrogen fuel from flowing into the station storage tank when the fill level reaches a desired level.

In some aspects, the techniques described herein relate to a system, wherein the desired level is the station storage tank reaching a full level.

In some aspects, the techniques described herein relate to a system, further including a differential pressure sensor having a first input and a second input, wherein the first input is coupled to a lower region of the station storage tank and the second input is coupled to an upper region of the station storage tank, and wherein the differential pressure sensor is configured to determine the difference in pressures at the first and second inputs.

In some aspects, the techniques described herein relate to a system, wherein the controller is configured to determine the fill level of the station storage tank based upon the difference in pressures.

In some aspects, the techniques described herein relate to a system configured to automatically purge a hydrogen fuel line, including: a hydrogen fuel line configured to fluidically couple a hydrogen tanker storage tank and a fueling station storage tank, the hydrogen storage tanker storage tank and the fueling station storage tank configured to store liquid hydrogen; an input valve configured to control the flow of hydrogen fuel to the fueling station storage tank; a station vent coupled to the hydrogen fuel line; a station vent control valve configured to control the flow of hydrogen fuel to the station vent; a memory storing computer-executable instructions; and a controller in communication with the memory and configured to execute the instructions to configure the controller to: send a control signal to a hydrogen tanker to cause a hydrogen tanker storage tank control valve to close and prevent hydrogen fuel from flowing into the hydrogen fuel line; close the input valve to prevent hydrogen fuel from flowing to and from the fueling station storage tank; open a warm hydrogen source valve to allow warm hydrogen fuel to flow from a warm hydrogen source to the hydrogen fuel line; open the station vent control valve to allow the warm hydrogen fuel to flow out of the station vent; and close the station vent control valve in response to a purge condition.

In some aspects, the techniques described herein relate to a system, wherein the purge condition includes one or more of: determining that a predetermined period has passed, determining that a temperature within the hydrogen fuel line has reached a threshold temperature, or determining a condensation level associated with the hydrogen fuel line has reached a threshold condensation level.

In some aspects, the techniques described herein relate to a system configured to automatically pre-cool a hydrogen fuel line, including: a hydrogen fuel line configured to fluidically couple a hydrogen tanker storage tank and a fueling station storage tank, the hydrogen storage tanker storage tank and the fueling station storage tank configured to store liquid hydrogen; an input valve configured to control the flow of hydrogen fuel to the fueling station storage tank; a station vent coupled to the hydrogen fuel line; a station vent control valve configured to control the flow of hydrogen fuel to the station vent; a memory storing computer-executable instructions; and a controller in communication with the memory and configured to execute the instructions to configure the controller to: send a control signal to a hydrogen tanker to cause a hydrogen tanker storage tank control valve to open and allow hydrogen fuel to flow into the hydrogen fuel line; close the input valve to prevent hydrogen fuel from flowing into and out of the fueling station storage tank; open the station vent control valve to allow cold hydrogen fuel to flow from the hydrogen fuel line to the station vent; receive a temperature measurement from temperature sensor; and close the station vent control valve when the temperature measurement reaches a predetermined level.

In some aspects, the techniques described herein relate to a system, wherein the temperature sensor is coupled to the station vent and indicates the temperature of hydrogen in the station vent.

In some aspects, the techniques described herein relate to a system, wherein the temperature sensor is coupled to the hydrogen fuel line and indicates the temperature of hydrogen in the hydrogen fuel line.

In some aspects, the techniques described herein relate to a computer-controlled method of automatically purging and precooling a hydrogen fuel line prior to transferring hydrogen fuel from a source to a storage tank, including: purging moisture from a hydrogen fuel line, wherein the hydrogen fuel line is configured to fluidically couple a hydrogen tanker storage tank and a fueling station storage tank, the hydrogen storage tanker storage tank and the fueling station storage tank configured to store liquid hydrogen; pre-cooling the hydrogen fuel line; causing hydrogen fuel to flow through the hydrogen fuel line to re-fill the fueling station storage tank; and expelling residual hydrogen fuel from the hydrogen fuel line when the fueling station storage tank re-filling is complete.

In some aspects, the techniques described herein relate to a computer-controlled method, wherein purging moisture from the hydrogen fuel line includes: sending a control signal to a hydrogen tanker to cause a hydrogen tanker storage tank control valve to close and prevent hydrogen fuel from flowing into the hydrogen fuel line; closing an input valve to prevent hydrogen fuel from flowing to and from the fueling station storage tank, wherein the input valve is configured to control the flow of hydrogen fuel to the fueling station storage tank; opening a warm hydrogen source valve to allow warm hydrogen fuel to flow from a warm hydrogen source to the hydrogen fuel line; opening a station vent control valve to allow the warm hydrogen fuel to flow out of a station vent, wherein the station vent is coupled to the hydrogen fuel line, and wherein the station vent control valve is configured to control the flow of hydrogen fuel to the station vent; and closing the station vent control valve in response to a purge condition.

In some aspects, the techniques described herein relate to a computer-controlled method, wherein the purge condition includes one or more of: determining that a predetermined period has passed, determining that a temperature within the hydrogen fuel line has reached a threshold temperature, or determining a condensation level associated with the hydrogen fuel line has reached a threshold condensation level.

In some aspects, the techniques described herein relate to a computer-controlled method, wherein pre-cooling the hydrogen fuel line includes: sending a control signal to a hydrogen tanker to cause a hydrogen tanker storage tank control valve to open and allow hydrogen fuel to flow into the hydrogen fuel line; closing an input valve to prevent hydrogen fuel from flowing into and out of the fueling station storage tank, wherein the input valve is configured to control the flow of hydrogen fuel to the fueling station storage tank; opening a station vent control valve to allow cold hydrogen fuel to flow from the hydrogen fuel line to a station vent, wherein the station vent is coupled to the hydrogen fuel line, and wherein the station vent control valve is configured to control the flow of hydrogen fuel to the station vent; receiving a temperature measurement from temperature sensor; and closing the station vent control valve when the temperature measurement reaches a predetermined level.

In some aspects, the techniques described herein relate to a computer-controlled method, wherein the temperature sensor is coupled to the station vent and indicates the temperature of hydrogen in the station vent.

In some aspects, the techniques described herein relate to a computer-controlled method, wherein the temperature sensor is coupled to the hydrogen fuel line and indicates the temperature of hydrogen in the hydrogen fuel line.

In some aspects, the techniques described herein relate to a computer-controlled method, wherein causing hydrogen fuel to flow through the hydrogen fuel line to re-fill the fueling station storage tank includes: sending a control signal to a hydrogen tanker to cause a hydrogen tanker storage tank control valve to open and allow hydrogen fuel to flow into the hydrogen fuel line; opening an input valve to allow hydrogen fuel to flow from the hydrogen fuel line into the station storage tank, wherein the input valve is configured to control the flow of hydrogen fuel to the fueling station storage tank; determining a fill level of the fueling station storage tank; and closing the input valve to prevent hydrogen fuel from flowing into the station storage tank when the fill level reaches a desired level.

In some aspects, the techniques described herein relate to a computer-controlled method, wherein the desired level is the station storage tank reaching a full level.

In some aspects, the techniques described herein relate to a computer-controlled method, further including receiving a differential pressure signal from a differential pressure sensor having a first input and a second input, wherein the first input is coupled to a lower region of the station storage tank and the second input is coupled to an upper region of the station storage tank, and wherein the differential pressure sensor is configured to determine the difference in pressures at the first and second inputs.

In some aspects, the techniques described herein relate to a computer-controlled method, wherein determining the fill level of the station storage tank is determined based upon the differential pressure signal.

In some aspects, the techniques described herein relate to a computer-controlled method of automatically purging a hydrogen fuel line, including: sending a control signal to a hydrogen tanker to cause a hydrogen tanker storage tank control valve to close and prevent hydrogen fuel from flowing into the hydrogen fuel line, wherein the hydrogen fuel line is configured to fluidically couple a hydrogen tanker storage tank and a fueling station storage tank, the hydrogen storage tanker storage tank and the fueling station storage tank configured to store liquid hydrogen; closing an input valve to prevent hydrogen fuel from flowing to and from the fueling station storage tank, wherein the input valve is configured to control the flow of hydrogen fuel to the fueling station storage tank; opening a warm hydrogen source valve to allow warm hydrogen fuel to flow from a warm hydrogen source to the hydrogen fuel line; opening a station vent control valve to allow the warm hydrogen fuel to flow out of a station vent, wherein the station vent is coupled to the hydrogen fuel line, and wherein the station vent control valve is configured to control the flow of hydrogen fuel to the station vent; and closing the station vent control valve in response to a purge condition.

In some aspects, the techniques described herein relate to a computer-controlled method, wherein the purge condition includes one or more of: determining that a predetermined period has passed, determining that a temperature within the hydrogen fuel line has reached a threshold temperature, or determining a condensation level associated with the hydrogen fuel line has reached a threshold condensation level.

In some aspects, the techniques described herein relate to a computer-controlled method of automatically pre-cooling a hydrogen fuel line, including: sending a control signal to a hydrogen tanker to cause a hydrogen tanker storage tank control valve to open and allow hydrogen fuel to flow into the hydrogen fuel line, wherein the hydrogen fuel line is configured to fluidically couple a hydrogen tanker storage tank and a fueling station storage tank, the hydrogen storage tanker storage tank and the fueling station storage tank configured to store liquid hydrogen; closing an input valve to prevent hydrogen fuel from flowing into and out of the fueling station storage tank, wherein the input valve is configured to control the flow of hydrogen fuel to the fueling station storage tank; opening a station vent control valve to allow cold hydrogen fuel to flow from the hydrogen fuel line to a station vent, wherein the station vent is coupled to the hydrogen fuel line, and wherein the station vent control valve is configured to control the flow of hydrogen fuel to the station vent; receiving a temperature measurement from temperature sensor; and closing the station vent control valve when the temperature measurement reaches a predetermined level.

In some aspects, the techniques described herein relate to a computer-controlled method, wherein the temperature sensor is coupled to the station vent and indicates the temperature of hydrogen in the station vent.

In some aspects, the techniques described herein relate to a computer-controlled method, wherein the temperature sensor is coupled to the hydrogen fuel line and indicates the temperature of hydrogen in the hydrogen fuel line.

In some aspects, the techniques described herein relate to a bayonet coupling system, including: a bayonet, the bayonet including a bayonet tube configured to enable the flow of hydrogen fuel therethrough, and a flange coupled to the bayonet tube; a seal, the seal configured to surround the bayonet tube and contact the flange along one side of the flange; a bayonet coupler, the bayonet coupler including a bayonet coupler tube having an inside diameter larger than an outside diameter of the bayonet tube, the bayonet coupler tube configured to receive the bayonet tube and to seal against the flange at the seal, wherein the bayonet coupler is fixedly mounted directly or indirectly to a hydrogen storage tank such that a longitudinal axis of the bayonet coupler is inclined a predetermined angle with respect to horizontal to prevent a substantial thermal gradient from forming at the seal.

In some aspects, the techniques described herein relate to a bayonet coupling system, wherein the angle is selected from the group consisting of: 20, 30, 40, 50, 60, 70, 80, 90 degrees, and at least 40 degrees.

In some aspects, the techniques described herein relate to a bayonet coupling system, wherein the bayonet tube is concentrically aligned with the flange.

In some aspects, the techniques described herein relate to a bayonet coupling system, wherein the seal includes an O-ring.

In some aspects, the techniques described herein relate to a bayonet coupling system, wherein the seal includes a gasket.

In some aspects, the techniques described herein relate to a bayonet coupling system, wherein the bayonet includes the seal.

In some aspects, the techniques described herein relate to a bayonet coupling system, wherein the bayonet coupler includes the seal.

In some aspects, the techniques described herein relate to a method of coupling a hydrogen fuel source to a hydrogen offload station, including: providing a bayonet, the bayonet including a bayonet tube configured to enable the flow of hydrogen fuel therethrough, and a flange coupled to the bayonet tube; providing a seal, the seal configured to surround the bayonet tube and contact the flange along one side of the flange; providing a bayonet coupler, the bayonet coupler including a bayonet coupler tube having an inside diameter larger than an outside diameter of the bayonet tube, the bayonet coupler tube configured to receive the bayonet tube and to seal against the flange at the seal, wherein the bayonet coupler is fixedly mounted directly or indirectly to a hydrogen storage tank such that a longitudinal axis of the bayonet coupler is inclined a predetermined angle with respect to horizontal to prevent a substantial thermal gradient from forming at the seal; inserting the bayonet into the bayonet coupler to fluidically couple the bayonet to the bayonet coupler.

In some aspects, the techniques described herein relate to a method, wherein the angle is selected from the group consisting of: 20, 30, 40, 50, 60, 70, 80, 90 degrees, and at least 40 degrees.

In some aspects, the techniques described herein relate to a method, wherein the bayonet tube is concentrically aligned with the flange.

In some aspects, the techniques described herein relate to a method, wherein the seal includes an O-ring.

In some aspects, the techniques described herein relate to a method, wherein the seal includes a gasket.

In some aspects, the techniques described herein relate to a method, wherein the bayonet includes the seal.

In some aspects, the techniques described herein relate to a method, wherein the bayonet coupler includes the seal.

In some aspects, the techniques described herein relate to a bayonet coupling system, including: a bayonet coupler, the bayonet coupler including a bayonet coupler tube having an inside diameter, wherein the bayonet coupler is configured to fluidically seal to a bayonet at a seal, wherein the bayonet includes a bayonet tube configured to enable the flow of hydrogen fuel therethrough, and a flange coupled to the bayonet tube, and wherein the seal is configured to surround the bayonet tube and contact the flange along one side of the flange; wherein the bayonet coupler tube is larger than an outside diameter of the bayonet tube, wherein the bayonet coupler tube configured to receive a bayonet tube and to seal against the flange at the seal, wherein the bayonet coupler is fixedly mounted directly or indirectly to a hydrogen storage tank such that a longitudinal axis of the bayonet coupler is inclined a predetermined angle with respect to horizontal to prevent a substantial thermal gradient from forming at the seal.

In some aspects, the techniques described herein relate to a bayonet coupling system, wherein the angle is selected from the group consisting of: 20, 30, 40, 50, 60, 70, 80, 90 degrees, and at least 40 degrees.

In some aspects, the techniques described herein relate to a bayonet coupling system, wherein the bayonet tube is concentrically aligned with the flange.

In some aspects, the techniques described herein relate to a bayonet coupling system, wherein the seal includes an O-ring.

In some aspects, the techniques described herein relate to a bayonet coupling system, wherein the seal includes a gasket.

In some aspects, the techniques described herein relate to a bayonet coupling system, wherein the bayonet includes the seal.

In some aspects, the techniques described herein relate to a bayonet coupling system, wherein the bayonet coupler includes the seal.

In some aspects, the techniques described herein relate to a control conduit configured to couple a controller of a liquid hydrogen offload system to a liquid hydrogen tanker, including: a control line, configured to transmit a control signal from the controller to the liquid hydrogen tanker; a gas detector, configured to detect hydrogen gas and provide a gas detector signal to the controller; and wherein the gas detector is secured to the control line at a predetermined distance from a tanker connection end of the control line.

In some aspects, the techniques described herein relate to a control conduit, wherein further including a connector configured to secure the gas detector to the control line.

In some aspects, the techniques described herein relate to a control conduit, wherein the connector is selected from the group including one or more of: a fastener, a shroud, a housing, and a tubing.

In some aspects, the techniques described herein relate to a control conduit, wherein the predetermined distance is selected from the group consisting of: less than 5, less than 10, less than 15, less than 20, less than 25, less than 50, less than 100, less than 150, and less than 200 cm.

In some aspects, the techniques described herein relate to a control conduit, wherein the control signal includes an electrical signal.

In some aspects, the techniques described herein relate to a control conduit, wherein the control signal includes a pneumatic or air pressure signal.

In some aspects, the techniques described herein relate to a method of coupling a controller of a liquid hydrogen offload system to a liquid hydrogen tanker, including: providing a control conduit including a control line, a gas detector, and a coupler at one end of the control conduit, wherein the control line is configured to transmit a control signal from the controller to the liquid hydrogen tanker, and wherein the gas detector is configured to detect hydrogen gas and provide a gas detector signal to the controller, wherein the gas detector is secured to the control line at a predetermined distance from the coupler; and coupling the control conduit to a liquid hydrogen tanker.

In some aspects, the techniques described herein relate to a method, wherein the control conduit further includes a connector configured to secure the gas detector to the control line.

In some aspects, the techniques described herein relate to a method, wherein the connector is selected from the group including one or more of: a fastener, a shroud, a housing, and a tubing.

In some aspects, the techniques described herein relate to a method, wherein the predetermined distance is selected from the group consisting of: less than 5, less than 10, less than 15, less than 20, less than 25, less than 50, less than 100, less than 150, and less than 200 cm.

In some aspects, the techniques described herein relate to a method, wherein the control signal includes an electrical signal.

In some aspects, the techniques described herein relate to a method, wherein the control signal includes a pneumatic or air pressure signal.

DETAILED DESCRIPTION

Hydrogen Fueling Station

Figure 1:
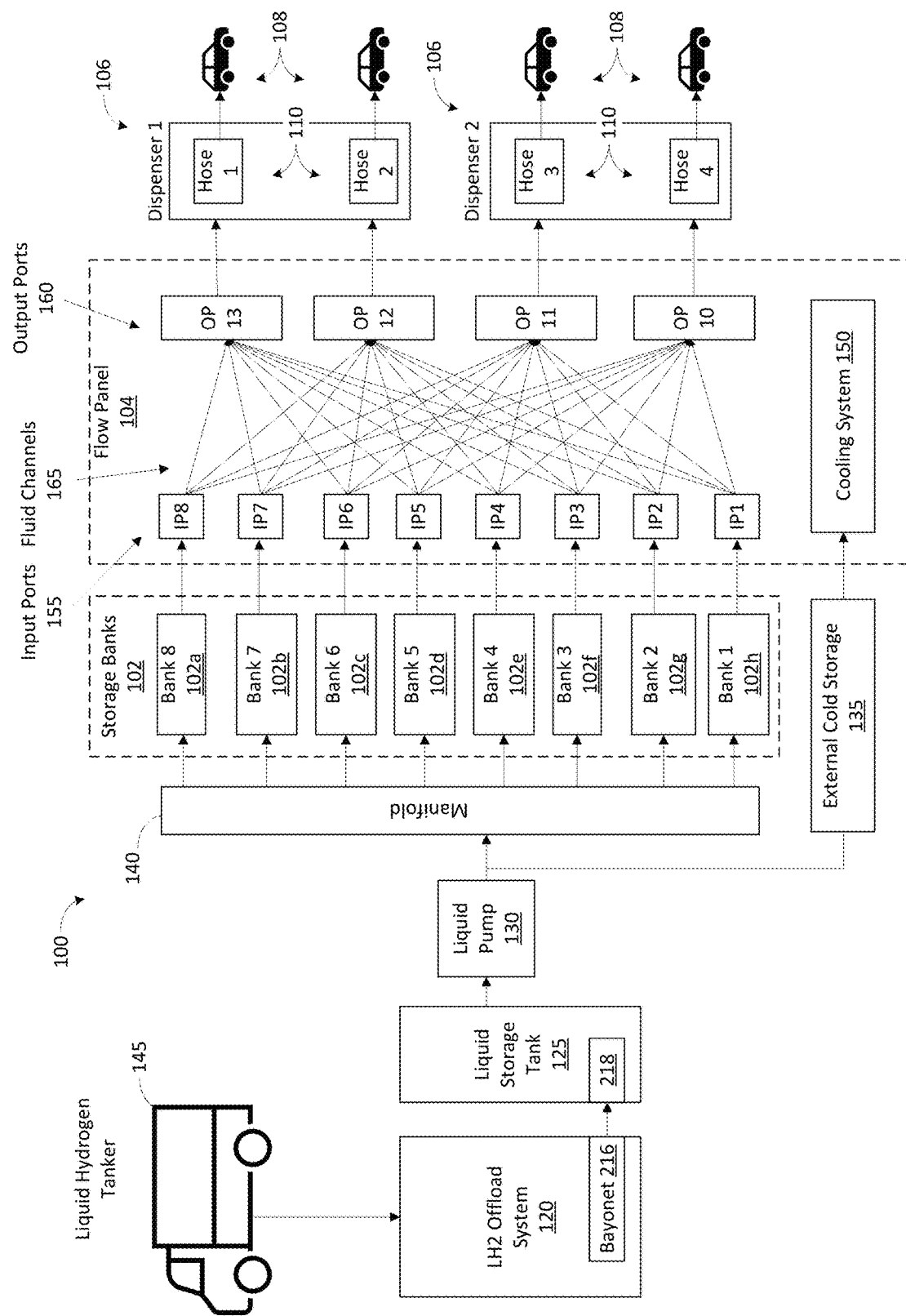
FIG. 1 provides a block diagram of one embodiment of a hydrogen fueling station.

FIG. 1 illustrates one embodiment of a hydrogen fueling station 100. The hydrogen fueling station 100 includes multiple storage banks 102 of hydrogen gas. Each bank 102 may include one or more tanks that are coupled together to store a larger volume of gas than an individual tank. Each storage bank 102 is coupled to a flow panel 104, which is sometimes referred to as a priority panel, or a flow controller. The flow panel 104 is coupled to one or more dispensers 106 (Dispenser 1, Dispenser 2), which may be coupled to one or more vehicles 108 to fuel the vehicles 108.

In one embodiment, the fueling station 100 includes eight storage banks 102 (Bank 1 102*a* through Bank 8 102*h*). Each storage bank 102 may be filled to a predetermined, desired pressure level. In addition, each dispenser 106 (Dispenser 1, Dispenser 2) includes two hoses 110 (Hose 1, Hose 2). Each hose 110 may be connected to a vehicle 108 to fuel the vehicle 108.

The fueling station 100 also includes a liquid hydrogen offload system 120, a liquid fuel storage tank 125, liquid fuel pump 130, external cold storage 135, and manifold 140. A liquid hydrogen tanker 145 brings liquid hydrogen to replenish the liquid hydrogen in the liquid storage tank 125. The tanker 145 couples to the liquid storage tank 125 via a liquid hydrogen offload system 120, shown in greater detail in FIG. 2. The liquid hydrogen offload system 120 provides a safe and efficient mechanism for transferring liquid hydrogen from the liquid hydrogen tanker 145 to the liquid storage tank 125.

The liquid storage tank 125 is configured to store liquid hydrogen fuel. The liquid pump 130 may include a compressor or other pump that draws liquid fuel from the liquid fuel storage tank 125, converts it to a gas, and pumps the gas into a manifold 140 that is fluidly connected to the storage banks 102. In some embodiments, multiple liquid fuel storage tanks 125 and/or multiple liquid fuel pumps 130 are provided. The pump 130 may pump the fuel into a manifold 140, as shown, directly into one or more storage banks 102a-h, or both. The liquid pump 130 may also provide gaseous hydrogen to an external cold storage system 135. The external cold storage system 135 is configured to store a cold medium (e.g., brine, etc.) and use the cold medium to provide cold hydrogen gas to the flow panel's cooling system 150. The flow panel's cooling system 150 is configured to control the temperature of the gaseous hydrogen fuel provided to the dispensers 106 from the storage banks 102.

The flow panel 104 may include one input port 155 for each storage bank 102, and one output port 160 for each dispenser hose 106. The illustrated embodiment of FIG. 1, the flow panel 104 includes 8 input ports 155 and four output ports 160, although any number of input and output ports 155, 160 may be provided. The output of each storage bank 102a-h is coupled to an input port 155 of the flow panel 104. Multiple fluid channels 165, or flow paths, (e.g., gas conduits, tubes, pipes, etc.) extend from the input ports 155 or the flow panel 104 to the output ports 160 of the flow panel 104. For example, each input port 155 may be connected to each output port 160. Therefore, in the illustrated embodiment, for each of the eight input ports 155, four flow channels 165 are provided in order to connect each input port 155 to each output port 160, resulting in a total of 32 flow channels 165. The flow panel 104 may include a different number of input and output ports 155, 160, but will generally equal the number of storage banks 102 and dispenser hoses 110, respectively.

Each flow channel 165 may be connected to flow control hardware, or a flow controller (e.g., solenoid, etc.) (not shown) located at each end of each flow channel 165 to selectively enable fluid flow between a desired input port 155 to a desired output port 160. For example, the flow controllers may be positioned between each storage bank 102 and each input 155 and also between each fluid channel 165 output and each output port 160. However, in other embodiments, flow controllers may be located in other locations. For example, flow controllers may be positioned between the input ports 155 and the fluid channel inputs and/or between the output ports 160 and the dispenser hoses 110.

In one embodiment, the flow panel 104 (sometimes referred to as a priority panel or flow controller) includes logic to select a desired storage bank 102 and to route fluid from the desired storage bank 102 to a selected dispenser hose 110. The flow panel 104 can include a controller or microprocessor (not shown) that determines one or more desired storage banks 102 for a selected dispenser hose 110, activates desired flow controllers to route fuel from the desired one or more storage banks 102 to the selected dispenser hose 110. In one embodiment, the flow panel 104 may also be used to control the filling of the liquid storage tank 125, which stores liquid hydrogen, as discussed further, below.

Figure 2:
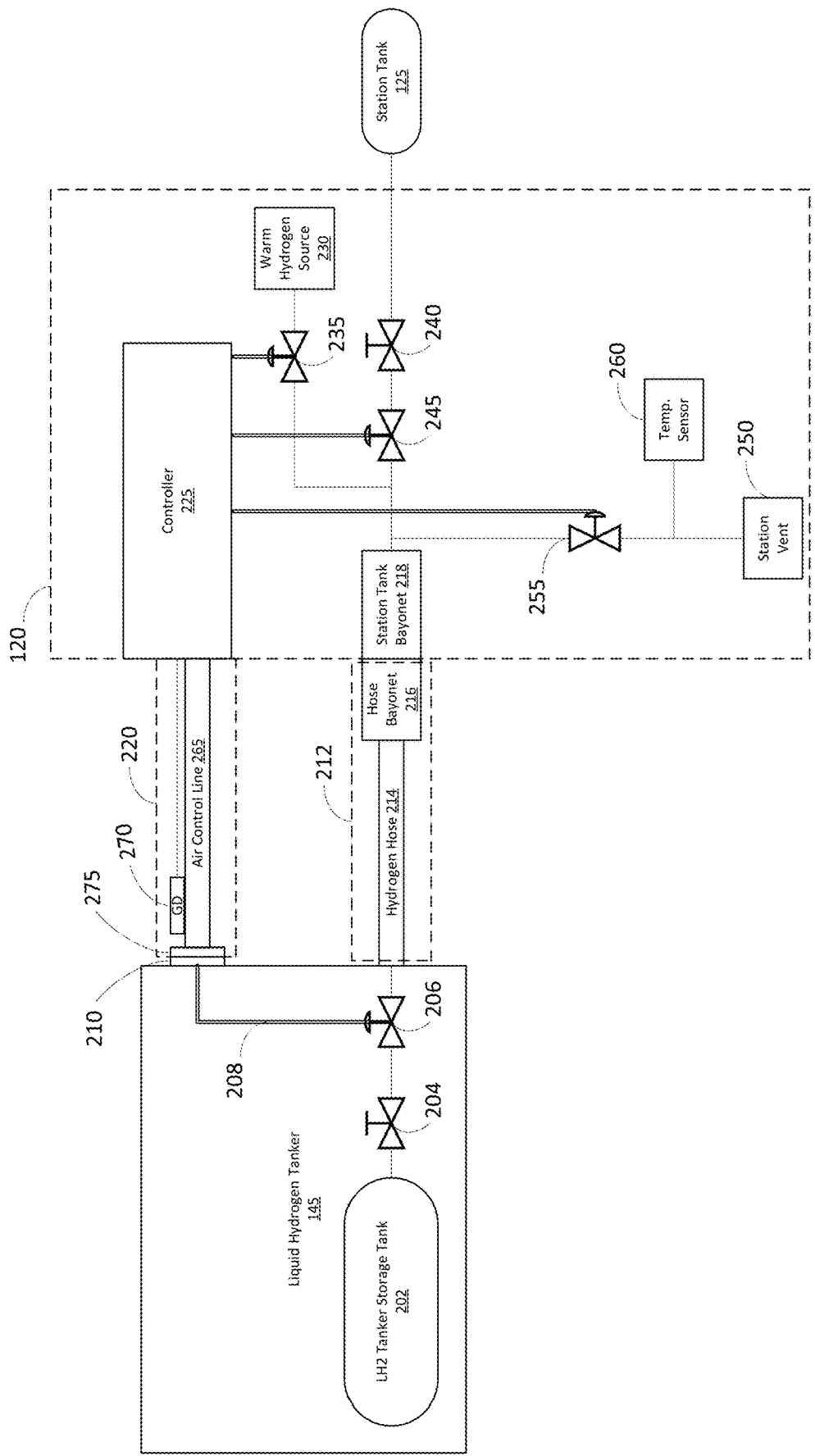
FIG. 2 provides a further detailed view of certain components of the hydrogen fueling station of FIG. 1.

FIG. 2 shows one embodiment of a system configured to control the filling of a filling station's liquid storage tank 125, which is sometimes referred to as the station tank or liquid storage tank. In the illustrated embodiment, a tanker 145 (LH2 Tanker), such as a liquid hydrogen tanker truck, is located at a filling station 100, and is preparing to fill the filling station's liquid storage tank 125 (H2 Station Tank). The tanker 145 includes a liquid hydrogen storage tank 202, a manual flow control valve 204, and an automatic flow control valve 206. The manual flow control valve 204 may be opened and closed manually to control the flow of liquid hydrogen fuel from the tanker's storage tank 202 to the tanker's automatic flow control valve 206. The automatic flow control valve 206 is controlled by a signal received by the automatic flow control valve via a tanker signal line 208. The tanker signal line 208 can receive a pneumatic or electrical control signal at a tanker control line connector 210 and communicate the control signal to the automatic flow control valve 206 via the tanker signal line 208. When opened, liquid hydrogen fuel is able to flow from the manual control valve 204 through the automatic control valve 206 and to a tanker fuel conduit 212.

Figure 4:
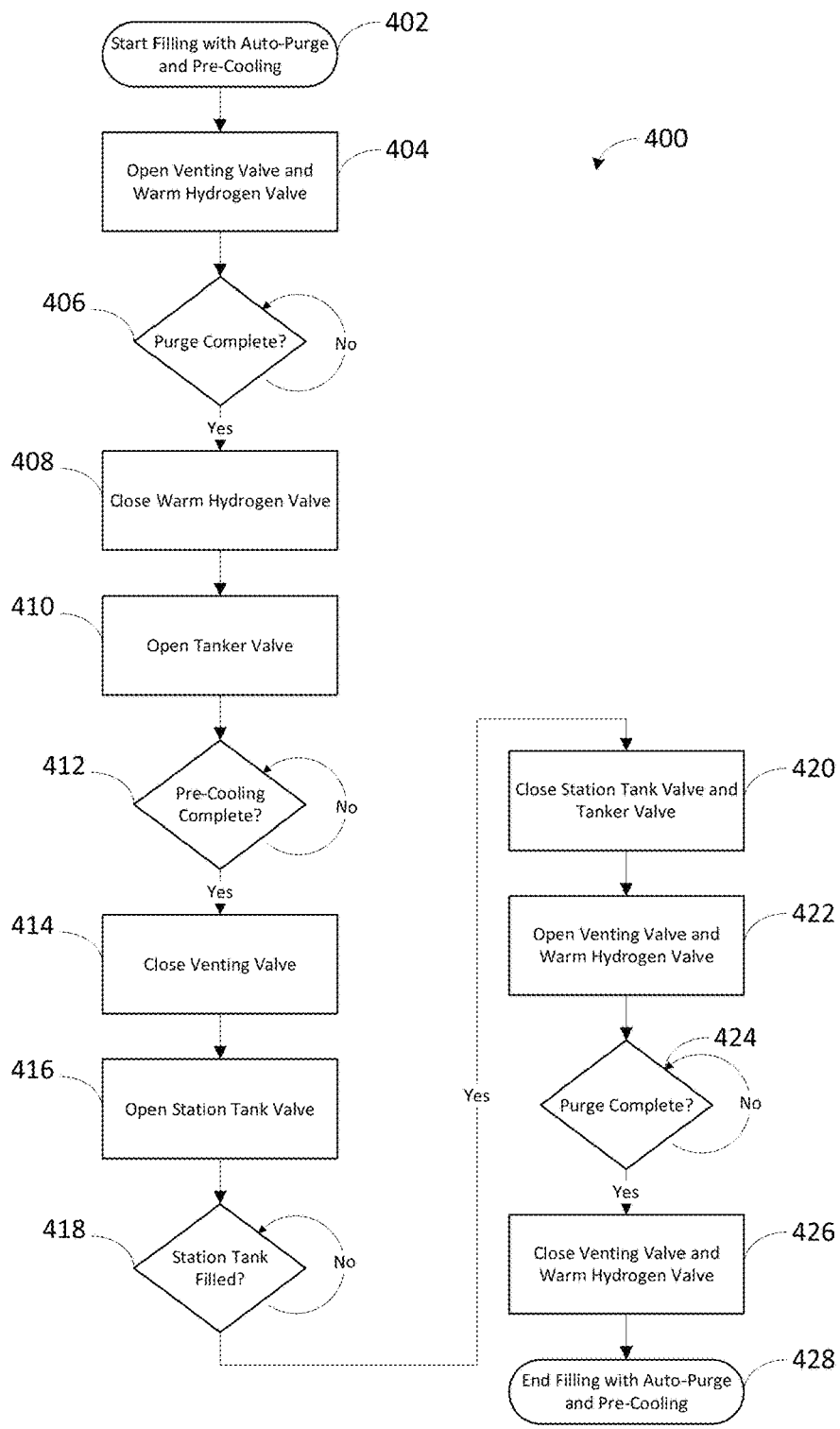
FIG. 4 is a flow chart illustrating one embodiment of a method of filling a liquid hydrogen storage tank with auto-purge and pre-cooling of the filling lines.

The tanker fuel conduit 212 includes a hydrogen hose 214 and a hose bayonet 216. The hydrogen hose 214 is coupled to the tanker's storage tank 202 and enables the flow of liquid hydrogen fuel from the storage tank 202 to the filling station to the station tank 125. The tanker fuel conduit's 212 hose bayonet 216 is configured to releasably mate and fluidically seal to a complementary bayonet, such as a station tank bayonet 218 coupled directly or indirectly to the station tank 125. One embodiment of the hose bayonet 216 to station tank bayonet 218 connection is illustrated in FIG. 4 and described in further detail, below.

A liquid hydrogen offload system 120 includes one or more tanker connections and various flow control valves to control the flow of liquid hydrogen from the tanker 145 and into the filling station's tank 125. In the illustrated embodiment, the liquid hydrogen offload system 120 includes the station tank bayonet 218, a control conduit 220, a controller 225, a warm hydrogen source 230, a warm hydrogen source control valve 235, a station tank manual valve 240, a station tank control valve 245, a station vent 250, a station vent control valve 255, and a temperature sensor 260

The control conduit 220 includes one or more air control lines 265, a gas detector 265, and a coupling 270. In some configurations, the control conduit 220 includes one or more electrical control lines in addition to, or instead of, the one or more air control lines 265. The control conduit 220 couples to the liquid hydrogen tanker via the connections 210, 275. Once connected, control signals, e.g., from the air control line(s) 265 and/or electrical control lines (not shown), may be communicated from the liquid hydrogen offload system 120 to the liquid hydrogen tanker 145. For example, the control signals may be used to control the operation of one or more automatic control valves (e.g., automatic control valve 206) coupled to the tanker 145. The gas detector 270 is positioned sufficiently close to the coupler 275 to be able to detect any gas leaks emanating from the coupler 210 to coupler 275 connection. For example, the gas detector 270 may be positioned less than 5, 10, 15, 20, 25, 50, 100, 150, or 200 cm from the coupler 275. The gas detector 270 may be enclosed within a sheathing of the control conduit 220, or it may be secured to the air control line 265. For example, the gas detector 270 may be secured to the air control line 265 with one or more clips, bands, straps, adhesives, hook and loop fabric, etc. When the gas detector 270 detects gas, it sends a signal to the controller 250. The controller may respond, for example, by activating an alarm, a visual indicator (e.g., light, message on a display (not shown), etc.) and close automatic valves to pause or terminate the transfer of liquid hydrogen from the tanker 150 to the station tank 125.

The controller 225 is configured to control the operation of all of the automatic valves in the liquid hydrogen offload system 120, and to send control signals to automatic valves (e.g., the liquid hydrogen tanker automatic control valve 206). The controller 225 may also receive signals, e.g., from the temperature sensor 260 and gas detector 270 to enable the controller 225 to determine whether to initiate, continue, pause, or stop liquid hydrogen transfer from the tanker 145 to the station tank 125.

A warm hydrogen source 230 is used to provide warm hydrogen to the hydrogen hose 214, and to purge moisture present in the hydrogen hose 214. The warm hydrogen source includes a tank of warm hydrogen, or a heating element used to heat hydrogen from the station's storage tank 125. In some cases, the warm hydrogen source 230 is provided by the liquid hydrogen tanker 145 and may not be included in the liquid hydrogen offload system. The station vent 250 allows gaseous hydrogen to vent out of the hydrogen hose 214 and other fluid channels (e.g., between the station bayonet 218 and valves 235, 240, 245, 255, warm hydrogen source 230 and/or station tank 125). A temperature sensor 260 is coupled to the output of the station vent control valve 255 to monitor the temperature of hydrogen gas vented or flowed through the station vent control valve 255 to the station exhaust vent 250.

The valves may be manual, electrically operated, pneumatic, and/or air-pressure controlled (or a combination of such valve types). Other valve types may be used, as well. In some embodiments, the flow control valve includes a solenoid valve (e.g., SV). An air-pressure controlled valve may be activated or deactivated by either applying or removing (depending upon whether the valve is normally opened or normally closed) air pressure to a control port on the air-pressure controlled valve.

Connecting the Tanker to the Station Tank

To establish a fluid connection between the tanker 145 and the filling station tank 125, the site is first secured. An air line (e.g., control conduit 220) from the filling station 100 liquid hydrogen offload system 120 is attached to an air input port and control line connector 210 coupled to the tanker 145. The air from the air control line 265 pressurizes the air lines connected to the air-pressure controlled valve 206. A gas detector 270 is tethered to or integrated with the air control line 265 such that the detector end of the gas detector is positioned near the tanker connection 210 when the air line 265 from the station 100 offload system 120 is attached to the tanker's air input port 210. An electrical conduit extends from the detector end of the gas detector 270 back to the filling station's controller 225 (e.g., the priority panel or flow panel or separate controller). The gas detector 270 is configured to monitor the tanker 145 for hydrogen fuel leakage during filling. If hydrogen is detected by the gas detector 270, the filling's station's offload system's controller 120 immediately terminates the flow of liquid hydrogen fuel from the tanker 145 to the station tank 125, as discussed below.

In addition, the gas detector 270 is tethered, or physically connected to the air control line 265 such that the gas detector 270 must be positioned near the tanker 145 during filling. The gas detector 270 sensor is attached to the air control line 265 near the end portion of the air line 265, as discussed above. The end portion of the air control line 265 includes an air control line connector 275, which is configured to be attached to the tanker connection 210 to enable filling. When the air control line connector 275 is attached to the tanker connector 210, the gas detector 270 becomes automatically positioned near the gas tanker 145. This eliminates any possibility that the operator may forget to attach the gas detector 270 to the tanker 145. The tether can include a fastener, shroud, housing, tubing, or other device to affix the gas detector 270 to the air control line 265 and/or control conduit 220. In some embodiments, the air control line 265 incorporates the gas detector 270 within or attached to the external tubing of the air control line 265.

A hydrogen hose 214 is used to connect the liquid hydrogen fuel line from the tanker (sometimes referred to as the trailer) 145 at the tanker connection (e.g., the hose bayonet 216) to the hydrogen line of the tank 125 at the tank connection (e.g., the station tank bayonet 218). The hydrogen hose 212 may connect to the station tank 125, tanker 145 or both, using a male-female bayonet pair 216, 218 attached to one end of the hydrogen hose 214 and to the station tank 125 (e.g., via fuel lines extending from the station tank 125 to manual and automatic valves 240, 245). One such bayonet pair 216, 218 is described below with respect to FIG. 3.

Purging and Pre-Cooling the Hydrogen Line

Because the temperature of the liquid hydrogen may be as low as −423° F. and the hydrogen hose 214, connections 216, 218, and valves 204, 206, 240, 245 may be at ambient temperature (e.g., +70° F. or more), it is desirable to pre-cool the hose 212, connections 216, 218, and valves 204, 206, 240, 245 to avoid inducing thermal stresses, which could cause failure or leakage. Initially, with the valves to the tanker 204, 206 and valves to the tank 240, 245 closed, warm hydrogen (e.g., above ambient temperature) is introduced into the lines to purge the lines and to avoid forming water condensation. The warm hydrogen may be supplied by the warm hydrogen source 230, located at the filling station 100 liquid hydrogen offload system 120 or in some cases, the trailer 145. The station vent control valve 255 is opened to allow warm hydrogen to flow from the warm hydrogen source 230 to the station vent 250. In some embodiments, the station vent control valve 255 is closed to allow warm hydrogen fuel to pressurize the hydrogen hose 214. When a sufficient pressure is reached, the station vent control valve 255 is opened. The release of the pressurized warm hydrogen in the hydrogen hose 214 help purge any moisture and impurities that may be located within the hydrogen hose 214 and bayonets 216, 218. The process of pressurizing and releasing the pressure from the hydrogen hose 214 may be repeated 2, 3, 4, 5, 6, 7, 8, 9, or 10 times, or more than 10 times to purge the moisture and any impurities that may be located within the hydrogen hose 214 and bayonets 216, 218.

A pressure sensor (not shown) coupled to the hydrogen hose 214 and/or connections checks for pressure leaks within the flow channel between tanker 145 and tank 125. A valve or valves 204, 206 at the tanker storage tank 202 and a valve 255 at the station vent 250 are opened to allow cool hydrogen to flow from the tanker storage tank 202, through the hydrogen hose 214, and to vent to atmosphere in order to pre-cool the flow channel, including the valves 204, 206, hydrogen hose 214, hose bayonet 216, and station tank bayonet 218.

When purging and pre-cooling the flow channel between the tanker storage tank 202 and station tank 125, such as shown in FIG. 2, an operator, a controller 225, or the flow panel 104, monitors the temperature of the flow channel (e.g., by monitoring condensation forming on the outside of the flow channel, by monitoring the temperature of the temperature sensor 260 (e.g., at the station vent 250), or any other technique) and opens and closes the control valve 206 at the tanker to control the flow of hydrogen into the flow channel. The temperature sensor reading is sent to the controller 225, flow panel 104, or priority panel to determine when the flow channel is sufficiently pre-cooled. In some embodiments, the controller 225 is incorporated into the circuitry and control hardware and software of the flow panel 104 or priority panel.

When sufficiently pre-cooled, the controller 225, flow panel, or priority panel sends one or more control signals (e.g., electrical signals to solenoids and/or air pressure signals to air-pressure controlled valves) to open the valves 206, 245 between the tanker storage tank 202 and the station tank 125, and to close the station vent valve 255. Liquid hydrogen then flows from the higher-pressure tanker storage tank 202 into the lower pressure, liquid hydrogen station storage tank 125.

Filling the Tank and Monitoring for Leakage

During filling (or offloading from tanker tank 202 to station tank 125) of the station tank 125, one or more pressure sensors coupled to the flow channel between the tanker tank 202 and station tank 125 monitor the pressure within the flow channel. A pressure drop may indicate a leak, in which case the controller 225, priority panel or flow controller sends control signals to the flow control valves 206, 245 in order to stop flow out of the tanker tank 202 and to stop flow into (and also to prevent loss of fluid from) the fueling station tank 125.

Once the station tank 125 is full, the system automatically 120 closes the valves 206, 245 at the tanker tank 202 and the station tank 125. A differential pressure sensor (not shown) may be used to determine whether the station tank 125 is full. For example, one input to the differential pressure sensor may be coupled to the top of the station tank 125, and the other input to the differential pressure sensor may be coupled to the bottom of the station tank 125. The difference in pressures correlates to how full the station tank 125 has been filled. When the pressure difference is about zero, the station tank 125 is empty. The pressure depends on the height of the liquid when the station tank 125 is full, so different station tank 125 sizes will have different pressures when full. In one embodiment, the station tank 125 is 2 m tall, and the pressure difference is about 14 mbar when the station tank 125 is full. A manual valve 204 at the tanker tank 202 and a manual valve 240 at the station tank 125 may be closed, as well. Once the valves 206, 245 are closed, the system 120 may purge the flow channel (e.g., hydrogen hose 214, fuel lines, and/or connections) with warm hydrogen (e.g., above ambient temperature) from the warm hydrogen source 230 to remove any liquid hydrogen remaining in the hydrogen hose 214, lines, and/or connections. During purging, the warm hydrogen control valve 235 may be opened to allow warm hydrogen to flow to the station vent 250, as shown in FIG. 5. When purging is completed, the valves 235, 255 are closed, and the user may disconnect the fuel conduit 212 and hydrogen hose 212, the control conduit 220 with gas detector 270 and air control line 265 from the tanker 145.

Bayonet Connection

Figure 3:
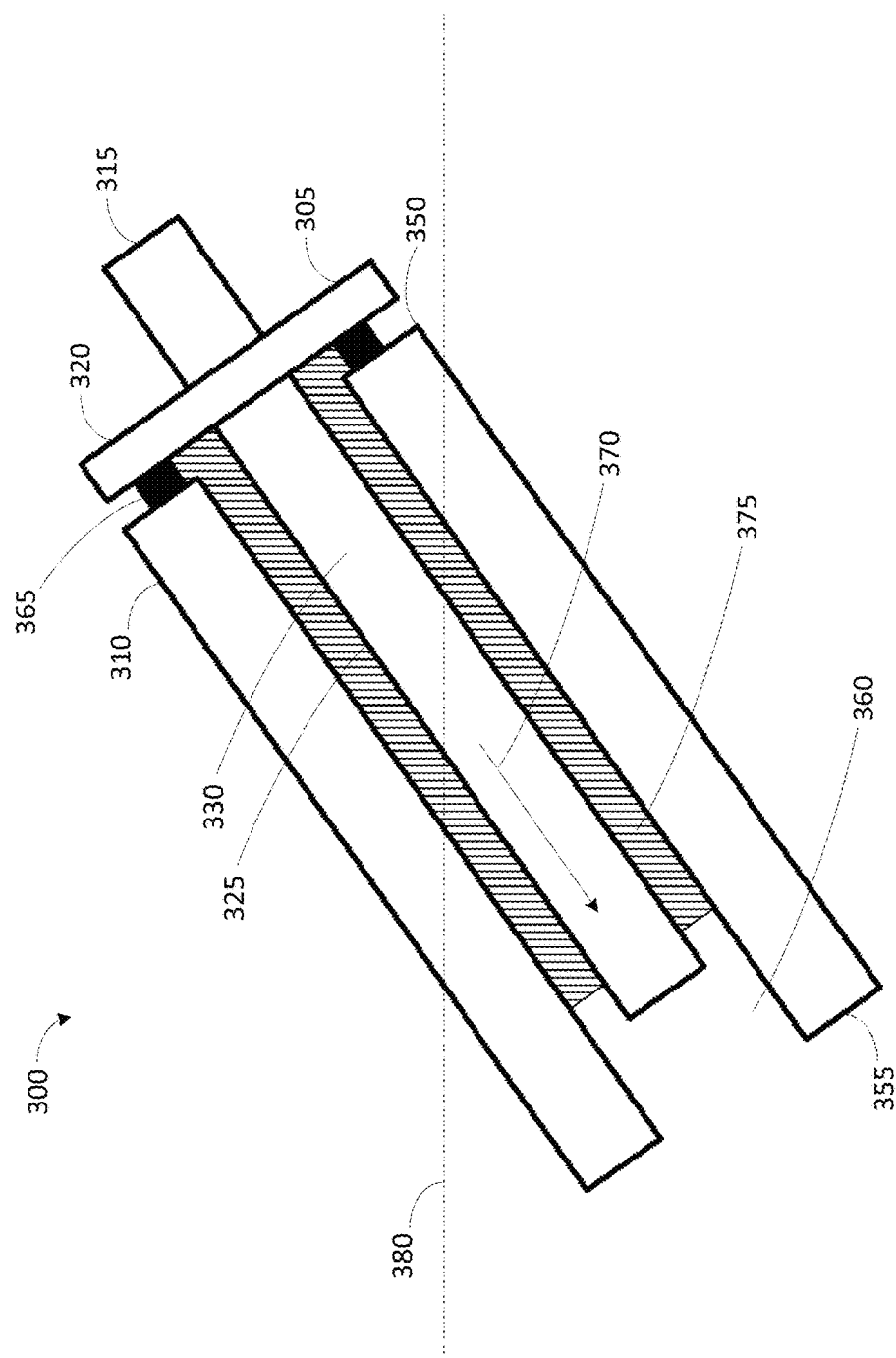
FIG. 3 is a detailed cross-sectional view of the hose and station tank bayonet of FIG. 2.

FIG. 3 illustrates one embodiment of a bayonet assembly 300, including a male bayonet 305 and a female bayonet 310. The male bayonet 305 (sometimes referred to as just the bayonet 305) is shown having been inserted into the female bayonet 310 (sometimes referred to as a bayonet connector 310). The bayonet 305 and bayonet connector 310 are used to couple the hydrogen hose 214 to the station tank 125 or tanker tank 202 (or both). The bayonet 305 includes an input tube 315, a flange 320, and an output tube 325. In some embodiments, the input and output tubes 315, 325 are input and output portions of the same tube. The flange 320 is located between the input and output tubes 315, 320, or when a single tube is used, near one end (e.g., the input end) of the tube. The flange 320 includes a top sealing O-ring 365 that provides a fluidic seal between the bayonet 305 and the bayonet connector 310. In some embodiments, the O-ring 365 is provided at the input end of the bayonet connector 310.

The bayonet connector 310 is a generally tubular structure that extends from the bayonet connector's input end 350 to its output end 355. The inside diameter of the bayonet connector 310 is large enough to receive the output tube 320 of the bayonet 305. The inside lumen 360 of the bayonet connector 310 allows liquid hydrogen to flow from the bayonet 305 and bayonet connector 310 and directly or indirectly into the station storage tank 125. An annular volume 375 is formed between the output tube 320 and the bayonet connector tubular wall 310 when the bayonet 305 is inserted into the bayonet connector 310. As liquid hydrogen flows through the bayonet 305 into the bayonet connector 310 along a flow path 370, some of the liquid hydrogen will naturally "boil off" and change from a liquid state to a gaseous state. The gaseous hydrogen will rise and collect within the annular volume 375.

If the bayonet 305 and bayonet connector 310 are mounted horizontally (not shown), then during filling, colder hydrogen gas will settle to the bottom surface of the bayonet connector wall 310 (along the length of the bayonet connector tube) while warmer hydrogen gas will rise to the top surface of the bayonet wall 310 (also along the length of the output bayonet tube). As a result, a large temperature gradient may be formed at the O-ring seal 365. This temperature gradient can cause premature failure of the O-ring seal 365.

To address this issue, the bayonet connector 310 may be directly or indirectly mounted to the station tank 125 or tanker storage tank 202 (or both) at a predetermined angle with respect to horizontal 380. For example, the bayonet connector 310 may be mounted at an angle of 20, 30, 40, 50, 60, 70, 80, or 90 degrees, or at least 40 degrees with respect to horizontal 380. By positioning the bayonet connector 310 (and bayonet 305, once it is inserted into and connected to the bayonet connector 310) at such angle, heat (e.g., warm hydrogen gas) will flow to one, higher end (e.g., the input end) of the bayonet 305 and bayonet connector 310 while the opposite end (e.g., the output end) remains cool. The resulting temperature gradient creates a natural convection barrier where cold gas stays low (towards the bayonet's output end) and below a horizontal axis 380 while warm gas rises towards the input end and remains above the horizontal axis 380. This configuration reduces thermal stress on the bayonet 305, bayonet connector 310, and O-ring seal 365 and can thereby extend the lifetime of these components. In one embodiment, the bayonet connector 310 is mounted vertically. In some embodiments, the bayonet connector 310 may be bent at one end (e.g., 20, 30, 40, 50, 60, 70, 80, or 90 degrees) or may be coupled to an elbow to attach the bayonet connector 310 to the station storage tank 125.

In other embodiments, the bayonet 305 is attached directly or indirectly to the station tank 125, and the bayonet connector 310 is attached to the fuel conduit 212 and hydrogen hose 214. In other words, the bayonet 305 and bayonet connector 310 may correspond to the hose bayonet 216 and station tank bayonet 218, respectively, or to the station tank bayonet 218 and the hose bayonet 216, respectively.

Reducing Setback while Satisfying Fire Code Requirements

Local fire codes may require significant setbacks of liquid hydrogen storage tanks and other filling station components due to the risks associated with traditional filling station technologies. However, embodiments of the present invention often go above and beyond local safety requirements by providing monitoring of leakage, pressure, and temperature and by automating many of the procedures (e.g., opening and closing valves, checking for leaks, monitoring temperature, etc.) that assure safe offloading of liquid hydrogen.

As a result, systems such as described herein may allow reducing the setback required of traditional fueling station components. For example, a minimum setback of 75 feet may be reduced to only 1 m or about 3 feet when utilizing the systems and techniques described herein. In addition, shorter hose connections between tanker and filling tanks also reduce risks associated with hydrogen offloading and can also reduce setback requirements. For example, a hydrogen hose configured to hold only 1 kg of liquid hydrogen may be used to couple the tanker to the fueling station tank.

Auto-Purge and Pre-Cooling Methods

One embodiment of a method 400 for filling a hydrogen storage tank with auto-purge and pre-cooling is shown in the flowchart of FIG. 4. The method 400 may be executed automatically by a controller, such as the controller 225 of FIG. 2 or the flow panel 104 of FIG. 1. The method 400 begins at block 402. At block 404, a venting control valve (such as the station vent control valve 255) and a warm hydrogen source valve (such as the warm hydrogen source valve 235) are opened. Other valves may be closed (such as tanker storage tank control valve and station tank control valve) and warm hydrogen flows from the warm hydrogen source to the station vent. The venting control valve may be cycled open and closed to allow pressure to build in the fluid lines, which help purge moisture that may be located in such fluid lines.

A controller determines if the purge is complete at block 406. For example, the controller may determine one or more of whether a predetermined time period has passed, whether the temperature inside one or more of the fluid lines has reached a predetermined temperature, or whether the condensation on the inside or outside of one or more of the fluid lines has reached a predetermined level. If purge is not complete, the method 400 continues purging and returns to block 406. When purge is complete, the method 400 continues to block 408.

At block 408, the controller closes the warm hydrogen valve and at block 410, the controller open a tanker storage tank valve 410. Opening the tanker storage tank valve allows cold liquid hydrogen fuel to flow out of the tanker storage tank and pre-cool the fluid lines. In one embodiment, the station tank control valve is also opened to allow the cold liquid hydrogen fuel to flow from the tanker storage tank to the station tank.

A controller determines if the pre-cooling is complete at block 412. For example, the controller may determine one or more of whether a predetermined time period has passed, whether the temperature inside one or more of the fluid lines has reached a predetermined temperature, or whether the condensation on the inside or outside of one or more of the fluid lines has reached a predetermined level. If pre-cooling is not complete, the method 400 continues pre-cooling and returns to block 412. When pre-cooling is complete, the method 400 continues to block 414.

At block 414, the venting valve is closed, and if it isn't opened already, the station tank valve is opened at block 416. The controller monitors the fuel level inside the station storage tank at block 418. For example, the controller may monitor the differential pressure between the top and bottom portions of the station tank. If the station tank is not filled, the station tank continues to be filled, and the method 400 returns to block 418. If the station tank is filled, the method 400 proceeds to block 420.

At block 420, the station tank control valve and the tanker storage tank control valves are closed. This prevents further fuel from exiting the tanker storage tank and entering the station tank. It also prevents fuel from exiting the station tank. At block 422, the venting valve and warm hydrogen valves are optionally opened once again to purge any fuel remaining in the hydrogen hose and fueling lines.

The controller determines if the purge is complete at block 424. For example, the controller may determine one or more of whether a predetermined time period has passed, whether the temperature inside one or more of the fluid lines has reached a predetermined temperature, or whether the condensation on the inside or outside of one or more of the fluid lines has reached a predetermined level. If purge is not complete, the method 400 continues purging and returns to block 424. When purge is complete, the method 400 continues to block 426.

At block 426, the venting valve and the warm hydrogen control valve are closed. The method 400 ends at block 428. The hoses and conduits coupling the liquid hydrogen tanker to the fueling station's liquid hydrogen offload system may be safely disconnected.

In some embodiments, a method of auto-purging the fuel lines of a liquid hydrogen offload system include only blocks 404-408 of the method 400. In some embodiments, a method of pre-cooling the fuel lines of a liquid hydrogen offload system include only opening a venting valve and blocks 410-414 of the method 400. In some embodiments, a method of filling a station tank includes opening a tanker storage tank valve and blocks 416-420 of the method 400.

OTHER CONSIDERATIONS

In some embodiments, systems and components as described herein can take the form of a computing system that is in communication with one or more computing systems and/or one or more data sources via one or more networks. The computing system may be used to implement one or more of the systems and methods described herein. While various embodiments illustrating computing systems and components are described herein, it is recognized that the functionality provided for in the components and modules (which may also be referred to herein as engines) of computing system may be combined into fewer components and modules or further separated into additional components and modules. Modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Any modules can be executed by one or more CPUs.

A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein can be implemented as software modules but may be also represented in hardware or firmware. Generally, the modules described herein refer to logical modules that may be combined with other modules or divided into sub-modules despite their physical organization or storage. In addition, all the methods described herein may be executed as instructions on a CPU and may result in the manipulation or transformation of data.

In some embodiments, hardware components of the system include a CPU, which may include one, two, or more conventional microprocessors. The system further includes a memory, such as random-access memory ("RAM") for temporary storage of information and a read only memory ("ROM") for permanent storage of information, and a mass storage device, such as a hard drive, flash drive, diskette, or optical media storage device. Typically, the modules of the system are connected using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example.

In some embodiments, systems and components thereof can be operatively coupled to a destination modality that can be an email or other messaging modality; SAMBA, Windows, or other file sharing modality; FTP or SFTP server modality; a VPN; a printer; and the like. In accordance with some embodiments, systems may be software or hardware-software systems. For example, systems can include a communication engine configured to receive and transmit information.

In accordance with some embodiments, communication engine may be any software or hardware software-system configured to receive and/or transmit data. Communication engine may be configured to transmit and receive data over a variety of network interfaces including wired and wireless networks or a combination thereof, such as via Ethernet, 802.11x, Bluetooth, FireWire, GSM, CDMA, LTE, and the like. Communication engine may also be configured to transmit and/or receive data with file transfer protocols such as TCP/IP, as well as various encryption protocols, such as, for example, WEP, WPA, WPA2, and/or the like.

Various other modifications, adaptations, and alternative designs are of course possible in light of the above teachings. Therefore, it should be understood at this time that within the scope of the appended claims the invention may be practiced otherwise than as specifically described herein.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

We claim:

1. A bayonet coupling system, comprising:
   a bayonet, wherein the bayonet comprises:
      a bayonet tube configured to enable the flow of hydrogen fuel therethrough;
      a flange coupled to the bayonet tube near one end of the bayonet tube; and
      a seal, wherein the seal is configured to contact the flange along one side of the flange; and
   a bayonet coupler, wherein the bayonet coupler comprises:
      a bayonet coupler tube having an inside diameter larger than an outside diameter of the bayonet tube, an inside surface, an outside surface, and an end surface at one end of the bayonet coupler tube and extending from the inside surface to the outside surface, wherein the bayonet coupler tube lacks a flange near the end surface,
      wherein the end surface of the bayonet coupler tube is configured to contact the seal opposite the flange and compress the seal against the flange to prevent fluid from flowing out of the bayonet coupler when the bayonet is inserted inside of the bayonet coupler; and
      an annular volume extending from the inside surface of the bayonet coupler tube and an inside surface of the seal to the bayonet tube, wherein the annular volume is defined by the flange on a first side of the annular volume, the seal and the bayonet coupler on a second side of the annular volume, and the bayonet tube on a third side of the annular volume, and wherein the annular volume is configured to capture boiled off gaseous hydrogen and to create a convection barrier and to eliminate a harmful temperature gradient at the seal;

wherein the bayonet coupler is configured to be fixedly mounted directly or indirectly to a hydrogen storage tank such that a longitudinal axis of the bayonet coupler is inclined a predetermined angle with respect to a horizontal.

2. The bayonet coupling system of claim 1, wherein the bayonet tube is concentrically aligned with the flange.

3. The bayonet coupling system of claim 1, wherein the seal comprises an O-ring.

4. The bayonet coupling system of claim 1, wherein the seal comprises a gasket.

5. The bayonet coupling system of claim 1, wherein the bayonet comprises the seal.

6. The bayonet coupling system of claim 1, wherein the bayonet coupler comprises the seal.

7. A method of coupling a hydrogen fuel source to a hydrogen offload station, comprising:

providing a bayonet, the bayonet comprising a bayonet tube configured to enable the flow of hydrogen fuel therethrough, a flange coupled to the bayonet tube, and a seal, the seal configured to contact the flange along one side of the flange;

providing a bayonet coupler, the bayonet coupler comprising:

a bayonet coupler tube having an inside diameter larger than an outside diameter of the bayonet tube, an inside surface, an outside surface, and an end surface at one end of the bayonet coupler tube and extending from the inside surface to the outside surface, wherein the bayonet coupler tube lacks a flange near the end surface, wherein the end surface of the bayonet coupler tube is configured to contact the seal opposite the flange and compress the seal against the flange to prevent fluid from flowing out of the bayonet coupler when the bayonet is inserted inside of the bayonet coupler; and an annular volume extending from the inside surface of the bayonet coupler tube and an inside surface of the seal to the bayonet tube, wherein the annular volume is defined by the flange on a first side of the annular volume, the seal and the bayonet coupler on a second side of the annular volume, and the bayonet tube on a third side of the annular volume, and wherein the annular volume is configured to capture boiled off gaseous hydrogen and to create a convection barrier and to eliminate a harmful temperature gradient at the seal;

wherein the bayonet coupler is configured to be fixedly mounted directly or indirectly to a hydrogen storage tank such that a longitudinal axis of the bayonet coupler is inclined a predetermined angle with respect to a horizontal; and inserting the bayonet into the bayonet coupler to fluidically couple the bayonet to the bayonet coupler.

8. The method of claim 7, wherein the bayonet tube is concentrically aligned with the flange.

9. The method of claim 7, wherein the seal comprises an O-ring.

10. The method of claim 7, wherein the seal comprises a gasket.

11. The method of claim 7, wherein the bayonet comprises the seal.

12. The method of claim 7, wherein the bayonet coupler comprises the seal.

13. A bayonet coupling system, comprising:

a bayonet coupler, the bayonet coupler comprising a bayonet coupler tube having an inside diameter, an inside surface, an outside surface, and an end surface at one end of the bayonet coupler tube and extending from the inside surface to the outside surface, wherein the bayonet coupler tube lacks a flange near the end surface, wherein the bayonet coupler is configured to fluidically seal to a bayonet at a seal, wherein the bayonet comprises a bayonet tube configured to enable the flow of hydrogen fuel therethrough, and a flange coupled to the bayonet tube, and wherein the seal is configured to surround the bayonet tube and contact the flange along one side of the flange, wherein the end surface of the bayonet coupler tube is configured to contact the seal opposite the flange and compress the seal against the flange to prevent fluid from flowing out of the bayonet coupler when the bayonet is inserted inside of the bayonet coupler;

wherein the bayonet coupler tube is larger than an outside diameter of the bayonet tube, wherein the bayonet coupler tube configured to receive the bayonet tube and to seal against the flange at the seal, and an annular volume extending from the inside surface of the bayonet coupler tube and an inside surface of the seal to the bayonet tube, wherein the annular volume is defined by the flange on a first side of the annular volume, the seal and the bayonet coupler on a second side of the annular volume, and the bayonet tube on a third side of the annular volume, and wherein the annular volume is configured to capture boiled off gaseous hydrogen and to create a convection barrier and to eliminate a harmful temperature gradient at the seal;

wherein the bayonet coupler is fixedly mounted directly or indirectly to a hydrogen storage tank such that a longitudinal axis of the bayonet coupler is inclined a predetermined angle with respect to a horizontal.

14. The bayonet coupling system of claim 13, wherein the bayonet tube is concentrically aligned with the flange.

15. The bayonet coupling system of claim 13, wherein the seal comprises an O-ring or a gasket.

16. The bayonet coupling system of claim 13, wherein the bayonet comprises the seal.

17. The bayonet coupling system of claim 13, wherein the bayonet coupler comprises the seal.

* * * * *